(12) United States Patent  
Kompella

(10) Patent No.: US 8,363,667 B2
(45) Date of Patent: *Jan. 29, 2013

(54) SUMMARIZATION AND LONGEST-PREFIX MATCH WITHIN MPLS NETWORKS

(75) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 148 days.

This patent is subject to a terminal disclaimer.

(21) Appl. No.: 13/088,961

(22) Filed: Apr. 18, 2011

(65) Prior Publication Data

US 2011/0194561 A1    Aug. 11, 2011

Related U.S. Application Data

(63) Continuation of application No. 12/403,496, filed on Mar. 13, 2009, now Pat. No. 7,929,557.

(60) Provisional application No. 61/114,782, filed on Nov. 14, 2008.

(51) Int. Cl.
*H04L 12/28* (2006.01)
*H04L 12/56* (2006.01)

(52) U.S. Cl. ........................................ 370/401; 370/254
(58) Field of Classification Search .................. 370/254, 370/400, 401
See application file for complete search history.

(56) References Cited

U.S. PATENT DOCUMENTS

| | | | |
|---|---|---|---|
| 5,600,642 A | 2/1997 | Pauwels et al. |
| 6,374,303 B1 | 4/2002 | Armitage et al. |
| 6,477,166 B1 | 11/2002 | Sanzi et al. |
| 6,493,349 B1 | 12/2002 | Casey |
| 6,501,754 B1 | 12/2002 | Ohba et al. |
| 6,553,028 B1 | 4/2003 | Tang et al. |
| 6,597,703 B1 | 7/2003 | Li et al. |
| 6,611,528 B1 | 8/2003 | Farinacci et al. |
| 6,625,773 B1 | 9/2003 | Boivie et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |

(Continued)

FOREIGN PATENT DOCUMENTS

| | | | |
|---|---|---|---|
| JP | 2005130258 A | 5/2005 |
| JP | 2005167482 A | 6/2005 |

(Continued)

OTHER PUBLICATIONS

Response filed with the European Patent Office Feb. 21, 2012 in corresponding EP Patent Application No. 09173544.9, 12 pgs.

(Continued)

*Primary Examiner* — Ronald Abelson
(74) *Attorney, Agent, or Firm* — Shumaker & Sieffert, P.A.

(57) ABSTRACT

In general, techniques are described for summarizing label mappings and thereby enabling longest-prefix match within Multi-Protocol Label Switching (MPLS) networks. More specifically, a first router included within a first area of a network comprises a control unit that maintains a label space defining labels available for mapping to a plurality of addresses assigned to network devices within the network. The control unit reserves a contiguous set of the labels of the label space and maps the contiguous set of labels to first area addresses. The first area addresses include those addresses of the plurality of addresses available for assignment to network devices within the first area. The first router also includes an interface card that transmits, to a second router of a second area of the network, an advertisement that advertises a summarized version of the mapping between the contiguous set of labels and the first area addresses.

20 Claims, 5 Drawing Sheets

U.S. PATENT DOCUMENTS

| | | | |
|---|---|---|---|
| 6,879,594 B1 | 4/2005 | Lee et al. | |
| 6,920,503 B1 | 7/2005 | Nanji et al. | |
| 6,968,389 B1 | 11/2005 | Menditto et al. | |
| 7,035,226 B2 | 4/2006 | Enoki et al. | |
| 7,039,687 B1 | 5/2006 | Jamieson et al. | |
| 7,082,102 B1 | 7/2006 | Wright | |
| 7,133,928 B2 | 11/2006 | McCanne | |
| 7,136,374 B1* | 11/2006 | Kompella | 370/352 |
| 7,251,218 B2 | 7/2007 | Jorgensen | |
| 7,269,135 B2 | 9/2007 | Frick et al. | |
| 7,281,058 B1 | 10/2007 | Shepherd et al. | |
| 7,330,468 B1 | 2/2008 | Tse-Au | |
| 7,333,491 B2 | 2/2008 | Chen et al. | |
| 7,359,328 B1 | 4/2008 | Allan | |
| 7,360,084 B1 | 4/2008 | Hardjono | |
| 7,366,894 B1 | 4/2008 | Kalimuthu et al. | |
| 7,418,003 B1 | 8/2008 | Alvarez et al. | |
| 7,463,591 B1 | 12/2008 | Kompella et al. | |
| 7,477,642 B2 | 1/2009 | Aggarwal et al. | |
| 7,483,439 B2 | 1/2009 | Shepherd et al. | |
| 7,489,695 B1 | 2/2009 | Ayyangar | |
| 7,519,010 B1 | 4/2009 | Aggarwal et al. | |
| 7,522,599 B1 | 4/2009 | Aggarwal et al. | |
| 7,522,600 B1 | 4/2009 | Aggarwal et al. | |
| 7,545,735 B1 | 6/2009 | Shabtay et al. | |
| 7,558,219 B1 | 7/2009 | Aggarwal et al. | |
| 7,558,263 B1 | 7/2009 | Aggarwal et al. | |
| 7,564,803 B1 | 7/2009 | Minei et al. | |
| 7,564,806 B1 | 7/2009 | Aggarwal et al. | |
| 7,570,604 B1 | 8/2009 | Aggarwal et al. | |
| 7,570,605 B1 | 8/2009 | Aggarwal et al. | |
| 7,570,638 B2 | 8/2009 | Shimuzu et al. | |
| 7,590,115 B1 | 9/2009 | Aggarwal et al. | |
| 7,593,405 B2 | 9/2009 | Shirazipour et al. | |
| 7,602,702 B1 | 10/2009 | Aggarwal | |
| 7,633,859 B2 | 12/2009 | Filsfils et al. | |
| 7,768,925 B2 | 8/2010 | He et al. | |
| 7,804,790 B1 | 9/2010 | Aggarwal et al. | |
| 7,933,267 B1 | 4/2011 | Aggarwal et al. | |
| 7,936,780 B1 | 5/2011 | Kompella | |
| 7,940,698 B1 | 5/2011 | Minei et al. | |
| 2002/0071390 A1 | 6/2002 | Reeves et al. | |
| 2002/0109879 A1 | 8/2002 | Wing So | |
| 2002/0118644 A1 | 8/2002 | Moir | |
| 2002/0126672 A1 | 9/2002 | Chow et al. | |
| 2002/0181477 A1 | 12/2002 | Mo et al. | |
| 2002/0186664 A1 | 12/2002 | Gibson et al. | |
| 2002/0191584 A1 | 12/2002 | Korus et al. | |
| 2003/0012215 A1 | 1/2003 | Novaes | |
| 2003/0021282 A1 | 1/2003 | Hospodor | |
| 2003/0031175 A1 | 2/2003 | Hayashi et al. | |
| 2003/0043772 A1 | 3/2003 | Mathis et al. | |
| 2003/0056007 A1 | 3/2003 | Katsube et al. | |
| 2003/0063591 A1 | 4/2003 | Leung et al. | |
| 2003/0087653 A1 | 5/2003 | Leung et al. | |
| 2003/0088696 A1 | 5/2003 | McCanne | |
| 2003/0099235 A1 | 5/2003 | Shin et al. | |
| 2003/0108047 A1 | 6/2003 | Mackiewich et al. | |
| 2003/0112748 A1 | 6/2003 | Puppa et al. | |
| 2003/0123446 A1 | 7/2003 | Muirhead et al. | |
| 2003/0172114 A1 | 9/2003 | Leung | |
| 2003/0177221 A1 | 9/2003 | Ould-Brahim et al. | |
| 2003/0191937 A1 | 10/2003 | Balissat et al. | |
| 2004/0037279 A1 | 2/2004 | Zelig et al. | |
| 2004/0047342 A1 | 3/2004 | Gavish et al. | |
| 2004/0081154 A1 | 4/2004 | Kouvelas | |
| 2004/0151180 A1 | 8/2004 | Hu et al. | |
| 2004/0151181 A1 | 8/2004 | Chu et al. | |
| 2004/0165600 A1 | 8/2004 | Lee | |
| 2004/0190517 A1 | 9/2004 | Gupta et al. | |
| 2004/0218536 A1 | 11/2004 | Yasukawa et al. | |
| 2004/0240445 A1 | 12/2004 | Shin et al. | |
| 2004/0240446 A1 | 12/2004 | Compton et al. | |
| 2005/0001720 A1 | 1/2005 | Mason et al. | |
| 2005/0018693 A1 | 1/2005 | Dull | |
| 2005/0027782 A1 | 2/2005 | Jalan et al. | |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0129001 A1 | 6/2005 | Backman et al. | |
| 2005/0169270 A1 | 8/2005 | Mutou et al. | |
| 2005/0220132 A1 | 10/2005 | Oman et al. | |
| 2005/0232193 A1 | 10/2005 | Jorgensen | |
| 2005/0259674 A1 | 11/2005 | Cuervo et al. | |
| 2005/0262232 A1 | 11/2005 | Cuervo et al. | |
| 2005/0265308 A1 | 12/2005 | Barbir et al. | |
| 2005/0271035 A1 | 12/2005 | Cohen et al. | |
| 2005/0271036 A1 | 12/2005 | Cohen et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0088031 A1 | 4/2006 | Nalawade | |
| 2006/0126496 A1 | 6/2006 | Filsfils et al. | |
| 2006/0126630 A1 | 6/2006 | Shirazipour et al. | |
| 2006/0133265 A1 | 6/2006 | Lee | |
| 2006/0147204 A1 | 7/2006 | Yasukawa et al. | |
| 2006/0153067 A1 | 7/2006 | Vasseur et al. | |
| 2006/0164975 A1 | 7/2006 | Filsfils et al. | |
| 2006/0182034 A1 | 8/2006 | Klinker et al. | |
| 2006/0221958 A1 | 10/2006 | Wijnands et al. | |
| 2006/0262735 A1* | 11/2006 | Guichard et al. | 370/254 |
| 2006/0262786 A1 | 11/2006 | Shimizu et al. | |
| 2007/0036162 A1 | 2/2007 | Tingle et al. | |
| 2007/0098003 A1 | 5/2007 | Boers et al. | |
| 2007/0124454 A1 | 5/2007 | Watkinson | |
| 2007/0140107 A1 | 6/2007 | Eckert et al. | |
| 2007/0189177 A1 | 8/2007 | Zhai | |
| 2007/0189291 A1 | 8/2007 | Tian | |
| 2008/0056258 A1 | 3/2008 | Sharma et al. | |
| 2008/0112330 A1 | 5/2008 | He et al. | |
| 2008/0123524 A1 | 5/2008 | Vasseur et al. | |
| 2008/0123654 A1 | 5/2008 | Tse-Au | |
| 2009/0028149 A1 | 1/2009 | Yasukawa et al. | |
| 2009/0175274 A1 | 7/2009 | Aggarwal et al. | |
| 2009/0225650 A1 | 9/2009 | Vasseur | |

FOREIGN PATENT DOCUMENTS

| | | |
|---|---|---|
| JP | 2005252385 A | 9/2009 |
| KR | 2004001206 | 1/2004 |
| WO | 0291670 A2 | 11/2002 |
| WO | 2004071032 A1 | 8/2004 |

OTHER PUBLICATIONS

Communication pursuant to Article 94(3) EPC received in corresponding EP Application No. 09173544.9, 4 pgs.

Satyanarayana et al., "Extensions to GMPLS RSVP Graceful Restart", draft-aruns-ccamp-restart-ext-01.txt, Jul. 2004, Network Working Group Internet Draft, 23 pgs.

Shah et al., "Extensions to MPLS-based Layer 2 VPNs," Network Working Group, Sep. 2001, 14 pp.

Kompella, "Layer 2 VPNs Over Tunnels," Network Working Group, Jan. 2006, 27 pp.

Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

Zhang et al. "A Destination-initiated Multicast Routing Protocol for Shortest Path Tree Constructions," GLOBECOM 2003, IEEE Global Telecommunications Conference, XP010677629, pp. 2840-2844.

Aggarwal et al., "Establishing Point to Multipoint MPLS TE LSPs," submitted to Internet Engineering Task Force (IETF) Feb. 11, 2007, pp. 1-15.

Yasukawa et al. "Requirements for Point to Multipoint extension to RSVP-TE," IETF, Oct. 2003, pp. 1-20.

Atlas et al., "MPLS RSVP-TE Interoperability for Local Protection/Fast Reroute," IETF, Jul. 2001, pp. 1-14.

Rosen et al., "Multicast in MPLS/BGP IP VPNs," draft-rosen-vpn-mcast-07.txt, May 2004, 27 pgs.

Deering et al., "Protocol Independent Multicast-Sparse Mode (PIM-SM): Motivation and Architecture," draft-ietf-idmr-pim-arch-05.txt, Aug. 4, 1998, 30 pgs.

Kompella et al., "Virtual Private LAN Service," draft-ietf-l2vpn-vpls-bgp-00.txt, May 2003, 22 pgs.

Rekhter et al., "A Border Gateway Protocol 4 (BGP-4)," Mar. 1995, 72 pgs.

Martini et al., "Transport of Layer 2 Frames Over MPLS," Network Working Group Internet Draft, draft-martini-l2circuit-trans-mpls-08.txt, Nov. 2001, 18 pgs.

Martini et al., "Encapsulation Methods for Transport of Layer 2 Frames Over IP and MPLS Networks," Network Working Group Internet Draft, draft-martini-l2circuit-encap-mpls-04.txt, Nov. 2001, 17 pgs.

Andersson et al., "LDP Specification", Network Working Group, RFC 3036, Jan. 2001, (118 pages).

Rekhter et al., "Carrying Label Information in BGP-4", Network Working Group, RFC 3107, May 2001 (6 pages).

Decraene et al. "LDP extensions for Inter-Area LSP", Network Working Group, draft-decraene-mpls-ldp-interatea-02.txt, Jun. 2006, (7 pages).

Decraene et al., "LDP extension for Inter-Area LSP", Network Working Group, draft-ietf-mpls-ldp-interarea-03.txt, Feb. 2008, (11 pages).

Swallow et al., "Network Scaling with Aggregated IP LSPs", Network Working Group, draft-swallo-mpls-aggregated-fec-00.txt, Jul. 2007, (10 pages).

Decraene et al. "LDP extensions for Inter-Area Label Switched Paths (LPSs)", Network Working Group, RFC 5283, Jul. 2008, (9 pages).

U.S. Appl. No. 11/213,640, by Rahul Aggarwal, filed Aug. 26, 2005.
U.S. Appl. No. 12/423,640, by Rahul Aggarwal, filed Apr. 14, 2009.
U.S. Appl. No. 12/427,542, by Rahul Aggarwal, filed Apr. 21, 2009.
U.S. Appl. No. 12/469,075, by Rahul Aggarwal, filed May 20, 2009.
U.S. Appl. No. 12/497,078, by Rahul Aggarwal, filed Jul. 2, 2009.
U.S. Appl. No. 12/497,957, by Rahul Aggarwal, filed Jul. 6, 2009.
U.S. Appl. No. 12/497,939, by Rahul Aggarwal, filed Jul. 6, 2009.
U.S. Appl. No. 12/574,428, by Rahul Aggarwal, filed Oct. 6, 2009.
U.S. Appl. No. 11/192,432, by Rahul Aggarwal, filed Jul. 28, 2005.

* cited by examiner

SUMMARIZATION AND LONGEST-PREFIX MATCH WITHIN MPLS NETWORKS

This application is a continuation of U.S. patent application Ser. No. 12/403,496, filed Mar. 13, 2009, which claims the benefit of U.S. Provisional Application No. 61/114,782, filed Nov. 14, 2008, the entire contents of each of which are incorporated herein by reference.

TECHNICAL FIELD

The invention relates to computer networks and, more particularly, configuring paths through computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Packet-based computer networks increasingly utilize label switching protocols for traffic engineering and other purposes. Multi-Protocol Label Switching (MPLS) is a mechanism used to engineer traffic patterns within Internet Protocol (IP) networks. MPLS may be viewed as a protocol that allows packet-based networks to emulate certain properties of a circuit-switched network. By utilizing MPLS, a source device can request a path through a network to a destination device, i.e., a Label Switched Path (LSP). An LSP defines a distinct path through the network to carry MPLS packets from the source device to a destination device. Each router along an LSP allocates a label and propagates the label to the closest upstream router along the path for use in forwarding MPLS packets along the path. Routers along the path cooperatively perform MPLS operations to forward the MPLS packets along the established path.

Routers at the beginning of the LSP are commonly known as ingress routers, while routers at the end of the LSP are commonly known as egress routers. Ingress and egress routers are more generally referred to as label edge routers (LERs). Internal routers along the LSP are commonly referred to as label switch routers (LSRs). A set of packets to be forwarded along the LSP is referred to as a forwarding equivalence class (FEC). A FEC, for example, may specify any packets associated with a particular destination address or prefix. As another example, the FEC may define quality of service (QoS) characteristics for the set of packets. A plurality of FECs may exist for each LSP, but there may be only one LSP for any given FEC. The ingress LER uses routing information, propagated from the egress LER, to determine the LSP, to assign labels for the LSP, and to affix a label to each packet of the FEC. The LSRs utilize MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The next router along the LSP is commonly referred to as a downstream router or a next hop.

The egress LER removes the label from the packet and forwards the packet to its destination in accordance with standard routing protocols.

Each LSR within the MPLS network maintains a separate and distinct label space from every other LSR within the MPLS network, and each LSR along a given LSP may assign a different MPLS label to the same FEC associated with the LSP. As a result of the distinct label spaces and random mappings, one or more LSRs may assign different labels to a FEC associated with packets to be forwarded to a given destination IP address or prefix. Thus, when establishing a LSP through a network, the LSRs exchange label mappings to overcome the random and independent assignment of MPLS labels to different FECs.

In this way, each router along the LSP maintains a context that associates a FEC with an incoming label and an outgoing label. When an LSR receives a labeled packet, the LSR typically swap the label (i.e., the incoming label) with the outgoing label by performing a exact match label lookup in its internal context. The LSR then performs a full label swap to replace at least one of the labels in the packet with a label allocated by the next hop LSR. The LSR then forwards the packet to the next LSR along the LSP.

SUMMARY

In general, techniques are described for best-match label forwarding, i.e., techniques that provide forwarding of MPLS packets by an Label Switching Router (LSR) without requiring the MPLS packets to necessary have labels that exactly and fully match the label assignments by the LSR. For example, as described herein, the LSR may perform a partial match lookup for a given MPLS label with respect to the LSRs label context and, based on the partial or subset lookup, perform only a partial label swap of a portion of the label, referred to herein as a label prefix.

In one example, the LSR within an MPLS network maintains a label space to enable a summarized mapping of FECs to labels or label ranges. When forwarding MPLS packets, the LSR performs a partial lookup of a portion of the MPLS label to the labels or label ranges allocated from the LSR's internal label context. In one exemplary implementation, the LSR performs a longest-prefix match lookup similar to that performed with respect to Internet Protocol (IP). This longest-prefix match lookup may also be referred to as a best-match. In other words, the LSR does not require an exact match typically required by conventional LSRs. Moreover, when establishing an LSP, rather than randomly assign a label to a FEC, the LSR reserves within the label space a block or contiguous set of labels for a particular area (e.g., subnet or prefix) of the MPLS network and maps or otherwise associates labels from the reserved block with a contiguous set of network destination addresses (e.g., IP addresses) assigned to that particular area within the MPLS network. As the reserved MPLS label block comprises a contiguous set of labels, the reserved block may be summarized as a range of labels identified by a label prefix, and the label prefix can be mapped to a corresponding network destination address range identified by a destination network address prefix.

When outputting MPLS messages to advertise the label assignment to upstream routers, the LSR may advertise a summarized version of the label assignment that maps the contiguous set of MPLS labels to the contiguous set of network destination addresses. In this way, the LSR need not individually advertise each exact match, one-to-one mapping between MPLS labels and destination addresses, thereby reducing mapping sizes and bandwidth consumption. Moreover, upstream LSRs that receive this summarized mapping may more efficiently perform label lookups by performing a partial or subset lookup, such as a longest-prefix match, rather than always processing and matching entire MPLS labels or otherwise performing an exact match using the entire label.

For example, a first router of a first area of the network (i.e., within a first subnet or a first network address prefix) maintains an MPLS label space and reserves within that MPLS label space one or more blocks or contiguous set of MPLS labels for advertisement outside of the first network area. These reserved or pre-allocated labels are referred to herein as "inter-area" labels. The first router may determine the number of labels to reserve (i.e., the size of the block) based on configuration information or data input by an administrator or other user or learned from another device. The administrator, in one instance, may enter configuration data defining the first area, such configuration data specifying a network address prefix associated with the network area, e.g., as an Internet Protocol (IP) address prefix or IP prefix, for short. In this instance, the first area may comprise a first IP sub-network or subnet identified by a first IP prefix, where the IP prefix specifies a certain number of most-significant bits on an IP address to be considered (e.g., x.x/16 so as to indicate that the first 16 bits of any IP address matching x.x. specifies a network destination within the IP subnet).

Based on the length of the network address prefix as specified by the configuration data, the first router computes a necessary number of MPLS labels likely to be needed by the first network area and reserves (i.e., pre-allocates) a number of sequential MPLS labels from its label context. In other words, the first router may predict a number of MPLS labels to pre-allocate based on knowledge of the size of IP address range associated with the portion of the network and optionally other characteristics, such as traffic patterns for the portion of the network, any Quality of Service required by the portion of the network, types of network traffic detected as being commonly delivered to the portion of the network. In some cases, the first router reserves an equal number of MPLS labels as a number of IP addresses identified by the IP prefix. In other cases, the first router may be configured to reserve more or less MPLS labels than the number of IP addresses within the IP prefix based on these or other characteristics of the portion of the network.

Once allocated, the first router may advertise a summarized version of the mapping to a second router positioned within a second area of the network, e.g., a second IP subnet identified by a second IP prefix different form the first IP prefix. This summarized version may comprise a summarized mapping between a label prefix that represents the pre-allocated, sequential labels of the reserved block and the IP prefix. Thus, rather than advertise individual one-to-one mappings of a single MPLS label to a single IP address, the first router may advertize a group of mappings in a summarized manner or on a many-to-many basis. Advertisements transmitted in accordance with the techniques therefore may be fewer and/or smaller in size, and the first router may conserve bandwidth using these advertisements, thereby reducing MPLS advertisement overhead.

The second router may, in response to this many-to-many advertisement, coordinate a label space maintained by the second router to reserve and map a similar contiguous set or block of labels to the same first area network addresses, e.g., those IP addresses included within the first IP prefix. Subsequently, the second router may receive MPLS packets having a label stack that includes a label from the label block reserved within the label space maintained by the second router. The second router may then perform a lookup using only a label prefix, i.e., a subset of the label without requiring an exact match. This form of lookup is referred to herein as a "longest prefix match" or a best match. The second router may then perform a partial swap on this label to replace only a prefix portion of the packet's current label with the matching label prefix originally received from the first router. After the partial label swap, the second router forwards this packet to the first router.

In another example, the first router may be an Area Border Router or an Autonomous System Border Router. The first router may also be configured to perform IP route aggregation. That is, the first router may take a number of first IP addresses or prefixes and aggregate them to a second single, shorter prefix. The first router then allocates a number of MPLS labels for the second IP prefix, creates a mapping of the first IP addresses to the labels, and advertises a summarized version of the mapping to the second router. The second router may, in response to this summarized advertisement, map a similar contiguous set of labels to the second IP prefix. The second router may then receive an MPLS packet, perform a partial lookup on the label on the packet, do a partial label swap and send it to the first router.

In one embodiment, a method comprising maintaining, with a first router of a first area of a network, a label space defining a plurality of labels available for mapping to a plurality of addresses assigned to network devices within the network and reserving, with the first router, a contiguous set of the plurality of labels defined by the label space. The method further comprising mapping, with the first router, the contiguous set of labels to a plurality of first area addresses, wherein the first area addresses include those addresses of the plurality of addresses available for assignment to network devices within the first area of the network, and transmitting, with the first router to a second router different than the first router of a second area of the network different form the first area, an advertisement that advertises a summarized version of the mapping between the contiguous set of labels and the first area addresses.

In another embodiment, a first router included within a first area of a network, the first router comprising a control unit that maintains a label space defining a plurality of labels available for mapping to a plurality of addresses assigned to network devices within the network, reserves a contiguous set of the plurality of labels defined by the label space and maps the contiguous set of labels to a plurality of first area addresses, wherein the first area addresses include those addresses of the plurality of addresses available for assignment to network devices within the first area of the network. The first router also includes at least one interface card that transmits, to a second router different than the first router of a second area of the network different form the first area, an advertisement that advertises a summarized version of the mapping between the contiguous set of labels and the first area addresses.

In another embodiment, a network system comprising a network that includes a first area and a second area, wherein the first and second areas are different from each other, a first router included within the first area, and a second router included within the second area, wherein the second router is different from the first router. The first router includes a control unit that maintains a label space defining a plurality of labels available for mapping to a plurality of addresses assigned to network devices within the network, reserves a contiguous set of the plurality of labels defined by the label space and maps the contiguous set of labels to a plurality of first area addresses, wherein the first area addresses include those addresses of the plurality of addresses available for assignment to network devices within the first area of the network. The first router further includes at least one interface card that transmits, to a second router different than the first router of a second area of the network different form the first area, an advertisement that advertises a summarized version of the mapping between the contiguous set of labels and the first area addresses.

In another embodiment, a computer-readable medium comprising instructions for causing a programmable processor to maintain, with a first router of a first area of a network, a label space defining a plurality of labels available for mapping to a plurality of addresses assigned to network devices within the network, and reserve, with the first router, a contiguous set of the plurality of labels defined by the label space. The instructions further cause the programmable processor to map, with the first router, the contiguous set of labels to a plurality of first area addresses, wherein the first area addresses include those addresses of the plurality of addresses available for assignment to network devices within the first area of the network, and transmit, with the first router to a second router different than the first router of a second area of the network different form the first area, an advertisement that advertises a summarized version of the mapping between the contiguous set of labels and the first area addresses.

In another embodiment, a method comprising receiving, with a first router of a first area of a network, a packet that includes a first label and destined for a second area of the network different from the first area, and performing, with the first router, a longest prefix match lookup on the first label in forwarding information maintained by the first router to determine a second label, wherein the longest prefix match lookup comprises matching the first label to a label prefix that summarizes a contiguous set of labels. The method further comprising swapping, with the first router, the first label for the second label determined from the longest prefix match lookup, and forwarding, with the first router, the packet based on the second label to a second router of the second area of the network.

In another embodiment, a first router of a first area of a network, the first router comprising at least one interface card that receives a packet that includes a first label and destined for a second area of the network different from the first area. The first router further comprising a control unit that performs a longest prefix match lookup on the first label in forwarding information to determine a second label, wherein the longest prefix match lookup comprises matching the first label to a label prefix that summarizes a contiguous set of labels, and swaps the first label for the second label determined from the longest prefix match. The at least one interface card forwards the packet based on the second label to a second router of the second area of the network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
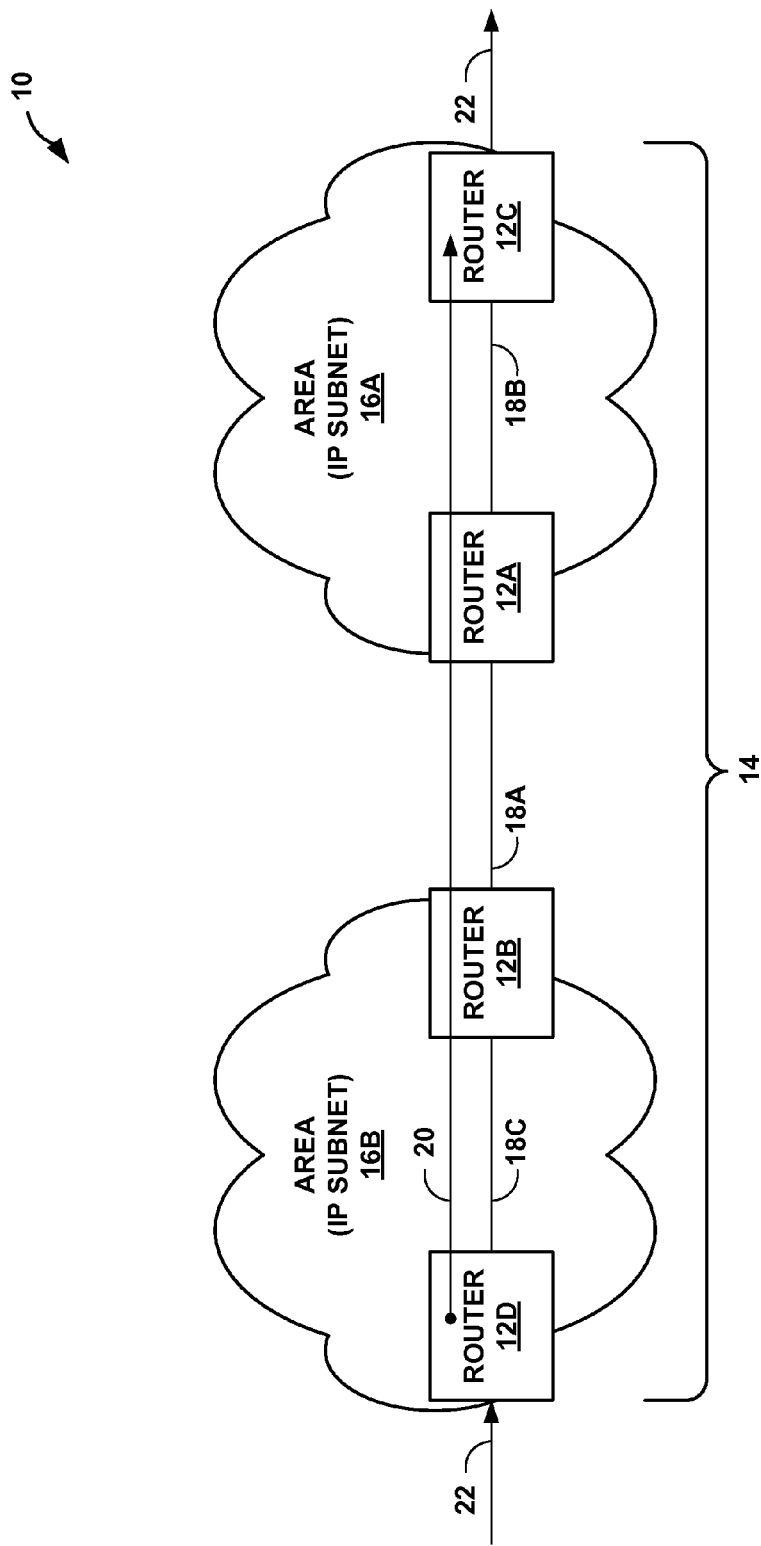
FIG. 1 is a block diagram illustrating an exemplary network system in which one or more network devices operate in accordance with the techniques described herein to summarize label mappings.

FIG. 1 is a block diagram illustrating an exemplary network system 10 in which one or more network devices operate in accordance with the techniques described herein to forward MPLS packets using best match MPLS label lookups and partial label swapping. While described herein with respect to particular network devices, such as routers 12A-12D ("routers 12"), the techniques may be implemented by any L2 and/or L3 device capable of maintaining an MPLS label space and performing MPLS forwarding. Layers, such as L2 and L3, may refer to layers of the Open Systems Interconnection (OSI) model, where L2 may refer to the data link layer and L3 may refer to the network layer.

As shown in FIG. 1, network system 10 includes a network 14, which may comprise a packet-based network, such as the Internet. Network 14 may be subdivided into one or more network areas 16A and 16B, where each area may comprise a separate and distinct Internet Protocol (IP) sub-network (or subnet for short). An IP subnet may represent a "network area" in that the IP subnet may be identified by a contiguous set of IP addresses or an IP prefix that defines a distinct area within an IP address space. The IPv4 address space comprises $2^{32}$ distinct IP addresses, as each IP address may correspond to a 32-bit binary number. Typically, an IP address is presented in four eight bit binary numbers (or, in other words, four bytes) with each eight bit binary number or byte separated by a period (.), which is a notation referred to as a quad-dotted decimal representation. For example, one IP address may be presented as 10.0.0.1. However, as a byte may represent a number as large as $2^8$-1 or $255_{10}$, each byte may represent a range of numbers from 0 to 255 in decimal, such that each IP address may vary from 0.0.0.0 to 255.255.255.255 again in quad-dotted decimal representation or notation. The IPv6 address space comprises $2^{128}$ distinct IP addresses and the techniques may be similarly applied.

An IP prefix identifies a subset of addresses with the IP address space and those addresses may be assigned to devices within a particular area within network 14. An IP prefix usually identifies a contiguous set of IP addresses within the IP address space. For example, a first IP prefix may identify a contiguous set of IP addresses from 10.0.0.1 to 10.0.0.255. This first IP prefix may be represented by a routing prefix or 10.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The first IP prefix may therefore be presented as 10.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

In this example, network 14 is subdivided into two network areas 16A, 16B ("areas 16") to facilitate routing, network management, and organization. As one example, a first area may comprise one branch of an enterprise, such as an accounting branch, while the other area may comprise a branch of the enterprise different form the first, such as an engineering branch. By partitioning the network in this way, an administrator can generally more easily manage the network topology, such as by defining different policies for permissible communications within and between each of the separate areas or to facilitate routing and traffic engineering. For example, the first part of a given IP address corresponds to an IP prefix, which is the portion masked by the subnet mask identifier and network devices, such as routers 12 may base routing decisions on the network prefix rather than the entire IP address. The remaining bits may identify the host of the address (or the device assigned the IP address), and only routers local to the host of the address need necessarily route based on the full network address including this host portion of the address. In this manner, routers may simplify routing decisions by basing these decisions on a subset of the bits of a given IP address rather than the entire IP address, while also, when necessary, basing local routing on the full IP address.

For purposes of illustration, it is assumed that each of areas 16 represents respective first and second IP subnets, each of which is different from the other. Area 16A is assumed to represent the first IP subnet defined by an IP prefix of 10.0.1/24, and area 16B is assumed to represent the second IP subnet defined by an IP prefix of 10.0.2/24. While shown as comprising only two areas 16, network 14 may comprise one or more or a plurality of areas, and the techniques may apply to any one or more networks, the combination of networks comprising two or more areas. Moreover, while shown as subdivisions of network 14, areas 16 themselves may each comprise networks, similar to network 14. In other words, areas 16 may be referred to as areas but may also represent networks or sub-network, and as a result, areas 16 may be referred to as "subnets" or "networks" depending on the scope or context in which these areas are described.

As further shown in FIG. 1, area 16A includes a router 12A and a router 12C, while area 16B includes a router 12B and a router 12D. Router 12A of first area 16A may couple to router 12B of second area 16B via a link 18A. Router 12A, 12C both of first area 16A may couple via a link 18B and routers 12B, 12D both of second area 16B may couple via link 18C. While shown as directly coupling to one another via links 18A-18C ("links 18"), one or more intermediate network devices, such as switches, gateways, firewalls, hubs or other routers, may be positioned between these router 12A-12D ("routers 12"). Moreover, although not shown in FIG. 1, network 14 may include other types of devices, such as personal computers, laptop computers, workstations, print services, application servers, web servers, file servers, intrusion detection and prevention devices or other security apparatus, or any other type of device capable of interfacing with a network, such as network 14, via a network protocol, e.g., IP.

In the example of FIG. 1, network 14 represents a packet-based network that routes data units referred to as packets across through network 14 from an ingress network device to an egress network device. Often, a service provider or other network operator may own, manage and maintain network 14 to facilitate delivery of a varying number of types of network traffic. That is, the service provider may own, manage and maintain network 14 as a transport between one or more customer networks (not shown in FIG. 1) for delivery of data corresponding to a plurality of protocols, including L2 protocols, such as an Ethernet protocol and the Asynchronous Transfer Mode (ATM) protocol, and L3 protocols, such as IP. These customer networks 14 may originate data to edge devices of network 14, such as router 12D, for delivery over packet-based network 14.

To accommodate data received via these varying protocols and emulate delivery of these protocols over packet-switched or -based network 14, routers 12 may implement a Multi-Protocol Label Switching (MPLS) protocol. MPLS refers to a class of protocols for establishing unidirectional Label Switched Paths (LSPs) through a packet-based network, such as network 14. MPLS pushes route selection to edge devices of the network, unlike IP which requires each router within the network (not just the edge devices) to perform route selection. MPLS may enable routing of data units corresponding to a variety of network protocols by switching not on particulars of the data units, such as an IP address of an IP packet, but by appending labels to the data units (thereby creating MPLS packets) and switching on the labels rather than the data units themselves. Thus, only the edge routers, such as routers 12D and 12C may be required to implement the variety of protocols to interface with the customer networks while interior or transport routers may need only support MPLS protocols to switch on multi-protocol labels of the MPLS packets.

One exemplary MPLS signaling protocol for signaling an LSP within network 14 may comprise a Label Distribution Protocol (LDP). In accordance with a label distribution protocol, a label switching router (LSR) downstream from an upstream LSR may signal a mapping associating a particular label to a particular Forwarding Equivalence Class (FEC) identifier. A FEC may define a set of packets that a given LSR forwards to the same next hop out of the same interface with the same treatment (e.g., queuing). Often, a FEC may be equated with a particular IP destination address (which is reachable via the next hop). The FEC identifier may uniquely identify a particular FEC. An LSR may be "upstream" from another LSR if it is farther up the flow (or "upstream") of a given unidirectional LSP from the other LSR. An LSR may be "downstream" from another LSR if it is farther down the flow (or "downstream") of a given unidirectional LSP from the other LSR.

In the example shown in FIG. 1, routers 12 have established an LSP 20 via an MPLS signaling protocol, such as LDP. As a result, routers 12 represent LSRs and may be referred to herein as "LSRs 12." Alternatively, routers 12 may establish LSP 20 via another MPLS signaling protocol referred to as a resource reservation protocol or RSVP, which may be extended, in some instances, to support Traffic Engineering (TE) to provide RSVP-TE. Network 14 may, as a result of supporting MPLS, be referred to as "MPLS network 14."

In accordance with the techniques described herein, one or more of LSRs 12 may exchange via the above advertisements a summarized version of the mapping between labels and FECs to establish inter-area LSP 20. In other words, rather than exchange a plurality of messages announcing one-to-one mappings between each MPLS label and a corresponding FEC, LSRs 12 may exchange advertisements announcing pre-allocated blocks of labels associated with a network address prefix. In this way, the announcements provided by the one or more LSRs 12 may summarize label MPLS label mappings to reduce overhead bandwidth consumption.

In some embodiments, the techniques may be employed inter-area rather than intra-area, where, for example, routers 12A of first area 16A and router 12B of second area 16B may perform the techniques to exchange summarized versions of the mappings inter-area, as each of routers 12A, 12B reside or are included within different areas 12A, 12B respectively. Routers 12A and 12C, both of first area 12A and therefore intra-area, may implement conventional MPLS protocols to exchanging, for example, one-to-one mappings between MPLS labels and FECs when establishing LSPs. Likewise, routers 12B and 12D may also use conventional MPLS protocols to exchange intra-area one-to-one mappings between MPLS labels and FECs.

For example, a router 12A, which is upstream from a router 12B, may maintain a separate and distinct label space from router 12B. The label space may, as described above, define a plurality of MPLS labels available for assignment to FECs when establishing LSPs. In accordance with the techniques described herein, router 12A may pre-allocate or otherwise reserve a contiguous set or block of the plurality of labels defined by the label space for use with respect to inter-area LSPs to network area 16A for which router 12 is an ingress LSR. Router 12A may determine a size of the block or number of labels to reserve based on a size of first area or IP subnet 16A with respect to the size of the network address space of the Internet Protocol (e.g., IPv4) associated with area 16A. As described above, an IP prefix assigned to IP subnet 16A defines a number of IP addresses reserved within the IP address space of the Internet Protocol deployed by the devices within the subnet. Assuming that the IP prefix for area 16A is 10.0.1/24, router 12A may in one example determine a number of labels to reserve as $2^8$ or 256 labels, thus effectively reserving an MPLS label for each of the IP addresses that may be used within area 16A. Router 12A may determine this by subtracting from the number of bits in an IP address, e.g., 32 for an IP version four (IPv4) address, the subnet mask following the dash of the IP prefix, e.g., 24 in the case of the IP prefix defining IP subnet 16A, to reach the exponent 8. In other words, router 12A may resolve the range of the host portion of the IP prefix. In other examples, router 12A may reserve more or fewer labels based on other characteristics of area 16A.

After reserving the label block of the determined size, e.g., 256 labels in this example, for use in association with intra-area network devices, e.g., devices within the same area 16A as router 12A, router 12A may map the contiguous set of labels to a plurality of first area addresses. The first area addresses may include those addresses of the plurality of addresses available for assignment to network devices within the first area of the network. In other words, the first area addresses comprise those addresses included within the IP prefix defining IP subnet 16A. For example, router 12A may reserve labels 9984-10239 of the label space maintained by router 12A for mapping to IP addresses included within the IP prefix of first area 16A, e.g., 10.0.1/24. Router 12A may map these labels 9984-10239 to 10.0.1/24 by sequentially mapping 9984 on a one-to-one basis to IP address 10.0.1.0, 9985 on a one-to-one basis to IP address 10.0.1.1, 9986 on a one-to-one basis to IP address 10.0.1.2, and so on.

Regardless of how mapped, when advertising these mappings, router 12A may transmit, to router 12B of a second area 16B different from first area 16A, an advertisement that advertises a summarized version of the mapping between the contiguous set of labels and the first area addresses. While described herein as mapping labels to first area addresses for ease of discussion, the first area addresses may each be included as a part of a FEC. Thus, labels may be mapped to first area FECs that each includes a respective first area address. The summarized version of the mapping may for example comprise an association of a label prefix and an IP prefix. Typically, a label comprises a plurality of fields, with one of the fields identifying a label number. The label number typically comprises a 20 bit number capable representing or uniquely identifying $2^{20}$ or 1,048,576 labels (which is also the size of the label space). To correctly map a label prefix to an IP prefix, router 12A may offset the label prefix by the difference between the number of bits used to represent an IP address, e.g., 32, and the number of bits used to represent a label identifier, e.g., 20, which equals 12. For example, a hexadecimal representation of a label prefix for labels $9984_{10}$ ($02700_{16}$) to 10239 ($027FF_{16}$) is $027_{16}/12_{10}$. Router 12A may map this label prefix to IP prefix 10.0.1/24, noting that subnet mask 24 of the IP prefix is offset by 12 to reach the subnet mask for the label prefix.

Router 12B may receive this summarized label mapping, rather than individual one-to-one mappings between each of labels 9984-10239 and corresponding IP addresses 10.0.1.0-10.0.1.255. By summarizing the mapping in this manner, router 12A may reduce the size of the advertisement, thereby decreasing overhead bandwidth consumption or bandwidth consumed for overhead, e.g., state or routing information, rather than actual customer data transmission. Router 12B may, upon receiving this summarized version of the mapping, update its label space to reflect this additional information by allocating a label from its label space to the labels defined by the received mapping. Router 12B may then update its forwarding table or information to indicate appropriate label actions, e.g., swap, pop, or push, to take to reach a given destination.

In particular, upstream router 12B allocates a label block from its label space of equal size to the label block advertised by router 12A. Router 12B may map each label of the allocated contiguous label block (equal in size to the number of labels represented by the label prefix included within the summarized version of the mapping) to a corresponding one of the labels represented by the label prefix received from router 12A. In other words, upstream router 12B may maintain its label space such that a contiguous set of MPLS labels in its independent and distinct label space maps to the contiguous set of MPLS labels reserved within the independent and distinct label space of downstream router 12A. Router 12B may in this way reserve a block of labels to improve the efficiency with which router 12B stores label mappings and performs label lookups.

For example, router 12B may map labels $8960_{10}$ ($02300_{16}$) through $9215_{10}$ ($023FF_{16}$) to labels ($02700_{16}$) to 10239 ($027FF_{16}$) maintained by first router 12A to reach IP prefix 10.0.1/24. Router 12B may store this mapping as a mapping between two label prefixes with the first label prefix identifying labels allocated and advertised upstream by router 12B for use in reaching router 12B and the second label prefix identifying labels allocated by router 12A and used to reach router 12A Thus, rather than store a plurality of random one-to-one associations between label mappings, router 12B may store a single summarized many-to-many label mapping representative of the plurality of one-to-one label mappings, which may reduce the storage space required to store these label mappings. Moreover, router 12B may perform label lookups based only on the first 12 bits rather than the entire 20 bits, thereby improving the performance of label lookups. This form of label lookup may be termed "longest prefix match." In this respect, the techniques may not only enable summarization of label-to-address mappings but also longest prefix matches within MPLS networks.

In this manner, router 12A may transmit to a network device of a different network area, such as router 12B, a summarized version of the MPLS label mappings between the reserved block of MPLS labels and the set of contiguous IP addresses defined by an IP prefix. Router 12B may then update its MPLS label state or space in a similar manner to reserve (i.e., pre-allocate) a contiguous set of labels that router 12B then maps to the contiguous set of labels identified by the summarized MPLS advertisement received from router 12A. Router 12A maintains label-to-label mappings for swapping those labels of the contiguous set of labels with labels maintained by router 12C. Similarly, Router 12D may receive a summarized MPLS advertisement from router 12B with a label prefix identifying the contiguous set of labels allocated by router 12B for reaching area 16A and, in response, updates its internal MPLS label space to randomly map MPLS labels to the contiguous set of labels announced by router 12B.

Upon receiving network traffic 22, router 12D operates as an ingress LSR for LSP 20 by determining to which of a plurality of FECs network traffic 22 belongs and appending a label corresponding to that FEC to network traffic 22, thereby creating at least one MPLS packet. Router 12D may, as an example, select the MPLS label by using the label prefix as the first part of the label and, for the last part of the label, using the last part of the IP address. In some instances, router 12D may use the label prefix as the first part of the label and, for the last part of the label, use unmasked portion of the IP address adjusted by some constant number.

After forming the MPLS packet, router 12D forwards the MPLS packet via link 18C to router 12B, whereupon router 12B may perform a lookup on the label of the MPLS packet. Router 12B may perform a longest-prefix match or lookup on the label. Assuming that the outer MPLS label of the inbound MPLS packet falls within the contiguous set of labels defined by the label prefix previously advertised to router 12D by router 12B, router 12B performs a forwarding lookup within its forwarding information to resolve the prefix portion of the outer MPLS label to the label prefix advertised by router 12A. Router 12B then performs a partial MPLS label swap by replacing only a portion of the outer MPLS label of the packet with the label prefix advertised by router 12B, which is described in more detail below. After the partial label swap, router 12B forwards the MPLS packet to router 12A, which may then, based on the FEC, swap the enter MPLS label with an MPLS label maintained by router 12C and forward the MPLS packet via link 18B to router 12C. Router 12C receives the MPLS packet from LSP 20 and operates as an egress LSR by popping the outer label. Unless additional inner labels are present, this operation typically un-encapsulates the MPLS packet to retrieve the original network traffic. Router 12C then forwards network traffic 22 to its destination.

The techniques may therefore significantly reduce MPLS state information otherwise required to be maintained by transport routers or LSPs, such as routers 12A, 12B, by aggregating or summarizing mappings. The techniques may further improve label lookup by enabling a longest-prefix match similar to that used in IP networks. Moreover, the techniques may enable partial swaps to facilitate the efficiency with which transport routers swap labels by reducing the number of bits required to be swapped, as described in more detail below. Each of these improvements may moreover improve how MPLS networks scale by possibly improving lookup speeds and swaps while enabling a more macro form of forwarding, e.g., forwarding by label prefix or longest prefix matching rather than exact match forwarding by individual labels. In this respect, different areas of a given MPLS network may reuse labels thereby possibly extending the rather small label space, especially when compared to large IP address spaces.

Figure 2:
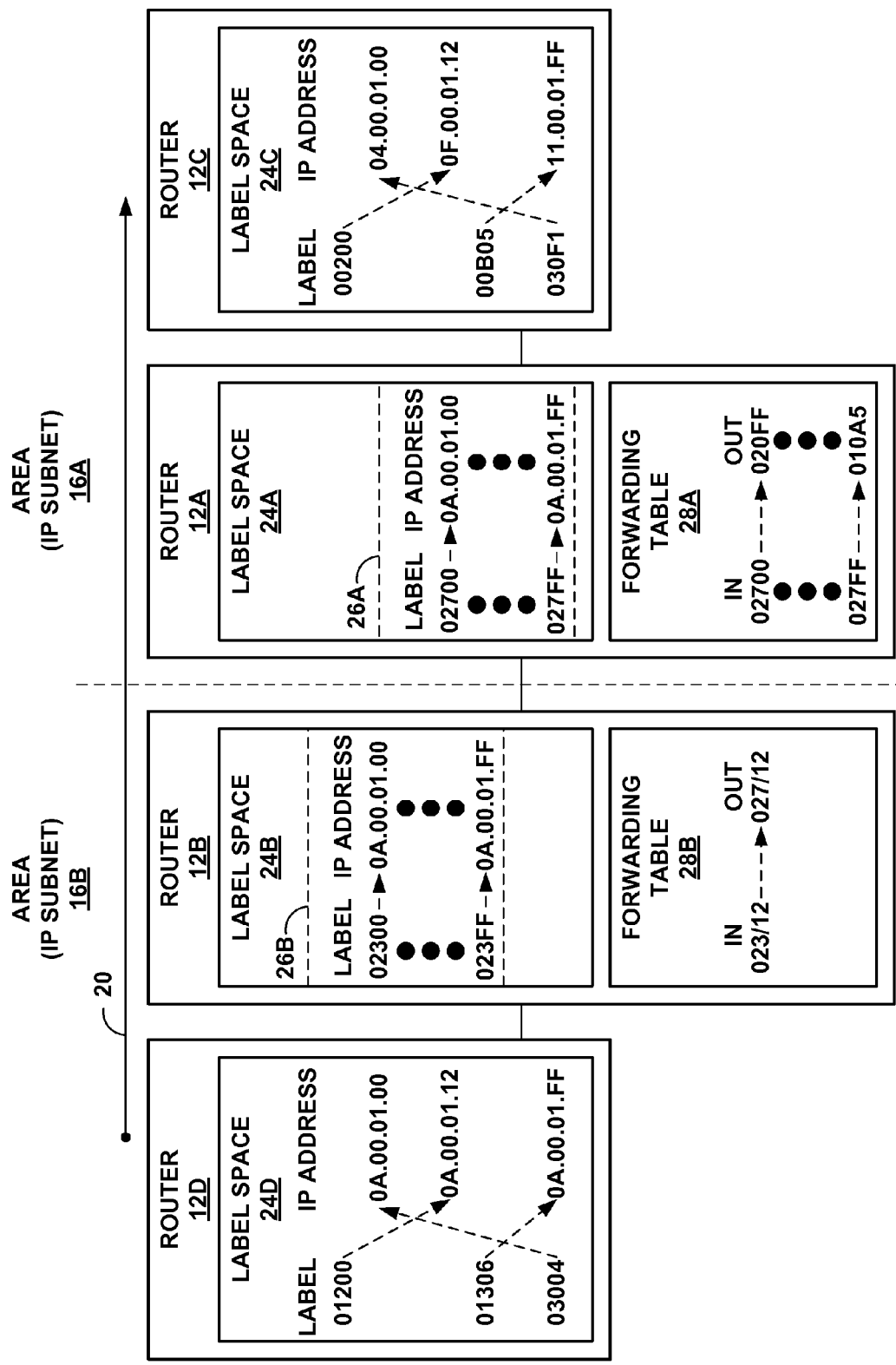
FIG. 2 is a block diagram illustrating an example embodiment of the routers of FIG. 1 in more detail.

FIG. 2 is a block diagram illustrating an example embodiment of routers 12 of FIG. 1 in more detail. Each of routers 12 includes and maintains a separate and distinct one of MPLS label spaces 24A-24D ("label spaces 24"). Each of exemplary labels spaces 24 maps a given label to a given FEC, which is usually defined by a destination IP address and typically other packet characteristics such as quality of service. While described for purposes of example with respect to mappings between MPLS labels and IP addresses, the techniques may apply to any mapping that permits a first network device to advertise a summarized version of the MPLS label bindings. The techniques therefore should not be limited strictly to label/IP address label mappings.

In the example of FIG. 2, router 12A includes a label space 24A in which router 12A has reserved a block or range of labels 26A. As an LSR operating at the edge or border of network area 16A, router 12A may therefore maintain label space 24A so as to reserve this block of labels 26A for upstream advertisement as a summarized label allocation for reaching network area 16A in accordance with the techniques described herein. Block of labels 26A includes labels identified by label identifiers $02700_{16}$ through $027FF_{16}$. Notably, block of labels 26A comprises a contiguous range or block of labels in that these labels within the block are identified by a sequential range of label identifiers. Router 12A allocates this block of labels 26A for use in LSPs subsequently used to reach any of IP addresses $0A.00.01.00_{16}$ (or $10.0.1.0_{10}$, which is the first address of the IP prefix assumed above to identify IP subnet 16A) through $0A.00.01.FF_{16}$ (or $10.0.1.255_{10}$, which is the last address of the IP prefix assumed above to identify IP subnet 16A).

Router 12B also includes a label space 24B in which router 12B has reserved a block or range of labels 26B in response to an upstream summarized advertisement of a label prefix from router 12A. Router 12B may therefore maintain label space 24B so as to reserve this block of labels 26B of similar size. In this example, block of labels 26B includes labels identified by label identifiers $02300_{16}$ through $023FF_{16}$. Notably, block of labels 26B comprises a contiguous range or block of labels in that these labels within the block are identified by a sequential range of label identifiers. Router 12B also maps block of labels 26B to IP addresses $0A.00.01.00_{16}$ (or $10.0.1.0_{10}$, which is the first address of the IP prefix assumed above to identify IP subnet 16A) through $0A.00.01.FF_{16}$ (or $10.0.1.255_{10}$, which is the last address of the IP prefix assumed above to identify IP subnet 16A).

Routers 12C and 12D also each include and maintain labels spaces 24C and 24D, respectively, however, routers 12C and 12D have not reserved any block of labels within label space 24D. Instead, routers 12C and 12D may randomly assign labels from label space 24D to particular IP addresses (or, more specifically, FECs). In this respect, routers 12C and 12D may operate in accordance with standard MPLS protocols.

As described above, routers 12 advertise label allocations and bindings with FECs, e.g. mappings between MPLS labels and IP addresses, so as to establish one or more LSP. LDP advertisements or RSVP RESV messages, for example, may be used to advertise MPLS label prefixes that have been allocated as described herein. In any event, this message exchange typically occurs using control-plane MPLS signaling protocols and typically originates at an egress router furthest downstream along a given LSP and proceeds upstream according a type of advertising referred to as "downstream advertisement," as it originates from the downstream network device. As router 12C represents the furthest downstream device with respect to LSP 20, router 12C first announces it allocated labels and label prefixes from its label space to router 12A.

In this example, egress router 12C maintains label space 24C such that a first label $00200_{16}$ is randomly mapped to an address $04.00.01.12_{16}$, outside of the range of addresses identified by IP prefix 10.0.1/24 defining IP subnet 16A, a second label $00B05_{16}$ is randomly mapped to a second IP address $11.00.01.FF_{16}$, and so on. In other words, router 12C may maintain label space 24C such that labels are randomly assigned to particular destination IP addresses on a one-to-one basis or for multiple FECs to the same destination address on a one to-many basis. Router 12C may transmit this mapping defined by label space 24C to router 12A in response to any updates to label space 24C.

Router 12A may receive this label mapping defined by label space 24C and resolve label space 24A with that of router 12C, or label space 24C. Router 12A may resolve these two label spaces to generate forwarding table 28A. Router 12A may include forwarding table 28A that defines MPLS operations that router 12A performs to route a particular MPLS packet along a given path, such as inter-area LSP 20. These operations may comprise a pop, push or swap label operation. The operations depicted in the example of FIG. 2 comprise swap label operations.

Router 12A then outputs an advertisement message specifying label bindings for label space 24A to router 12B, which proceeds to resolve label space 24B with label space 24A to update forwarding table 28B within its data plane. Notably, router 12A, as a result of reserving label block 26A for a set IP prefix, may advertise label block 26A as a summarized mapping that maps label prefix $027_{16}/12_{10}$ to IP address prefix $0A.00.01_{16}/24_{10}$. In this respect, router 12A may advertise a summarized version of one-to-one mappings between a contiguous block of labels and a contiguous range of destination addresses.

Router 12B receives this enhanced signaling advertisement summarizing the label mapping and resolves this mapping with label space 24B to produce forwarding table 28B. Forwarding table 28B may be similar to forwarding table 28A in that forwarding table 28B also comprises label to label mappings (not shown in FIG. 2). However, forwarding table 28B may also comprise label prefix-to-label prefix mappings, such as the mapping from label prefix $023_{16}/12_{10}$ to $027_{16}/12_{10}$. In this respect, router 12B may maintain forwarding table 28B with more efficiency as label prefix-to-label prefix mappings may conserve memory resource over label-to-label mappings.

Router 12B may then advertise label space 24B to router 12D, which may also resolve label space 24B with label space 24D to produce a forwarding table. Forwarding tables for routers 12C and 12D are not shown in the example of FIG. 2 for ease of illustration purposes. Routers 12 may advertise these label-to-IP-address bindings or mappings at any time. Typically, as described below, router 12A advertises the summarized version of the mapping in response to receiving configuration information from an administrator that defines the IP prefix. Routers 12 may then learn of the label mappings and construct LSPs, such as LSP 20, through network 14.

Moreover, the forwarding table for router 12D with respect to inter-area LSP 20 may simply comprise a plurality of push label operations to push one of labels included within the $023_{16}/12_{10}$ label prefix onto a data unit. In other words, router 12D may comprise an ingress LSR that determine whether data units arriving at router 12D are permitted to enter LSP 20. Likewise, router 12C may comprise a forwarding table similar to forwarding tables 28A, 28B, but that are not shown in FIG. 2 for ease of illustration purposes, because the operations for LSP 20 comprise label pop operations to pop one of the randomly assigned labels form the label stack. In this respect, router 12C may comprise an egress LSR for LSP 20.

Thus, router 12D may inspect an incoming data unit to determine a destination address, e.g., one of IP addresses included within IP prefix $0A.00.01_{16}/24_{10}$, and push one of labels included within the $023_{16}/12_{10}$ label prefix. Router 12D may determine which label to push by utilizing the lower 8-bits, in this instance, of the determined IP address as the lower 8-bits, again in this instance, of the label without modification. For example, router 12D may determine an IP destination address for a data unit of $0A.00.01.01_{16}$. Router 12D may further determine that this IP address corresponds has been bound to label prefix $023_{16}/12_{10}$. Router 12D may then determine that the last 8-bits of the IP address are used for the last 8-bits of the label by subtracting the length of the subnet mask of the determined label prefix, e.g., 12 in this instance, from the total number of bits used to identify a label, e.g., 20 bits, for a total of 8-bits. Router 12D may then construct the label as the upper 12 bits of the label prefix (or $023_{16}$) appended to the lower 8 bits of the IP address or $01_{16}$ for a label identifier of $02301_{16}$. Router 12D may then forward this MPLS packet that includes the label identified by label identifier $02301_{16}$ via LSP 20 to router 12B.

Router 12B may receive this MPLS packet and perform a lookup on the pushed label $02301_{16}$. Router 12B may perform a longest prefix match lookup on this label when comparing this label to the above described label prefix-to-label prefix mapping of $023_{16}/12_{10}$ to $027_{16}/12_{10}$. That is, router 12B may compare only the first 12 bits of the label to the first 12 bits of the label prefix-to-label prefix mapping. Considering that the first 12 bits of the label matches the first 12 bits of the mapping, router 12B may perform a partial label swap to swap only the first 12 bits of the label with the first 12 bits of the out label mapping. In other words, router 12B replaces only the $023_{16}$ portion of the label with the $027_{16}$ portion of the out label defined by the label prefix-to-label prefix mapping. In this respect, router 12B may partially swap a label by swapping only a portion while not swapping or leaving the lower 8 bits. Router 12B may then forward this MPLS packet with the new label $02701_{16}$ to router 12A.

Notably, router 12B may, in some instances, only perform longest prefix label forwarding if all labels matching the label prefix have the same next-hop action, e.g., swap. As a result, router 12B may only perform longest prefix label forwarding if all matching labels have a similar Next Hop Label Forwarding Entry (NHLFE), all labels matching the label prefix are assigned the same Class of Service (CoS) treatment and all labels matching the label prefix get the same Time-To-Live (TTL) treatment. For all labels to have the same NHLFE, all matching labels may, in some cases, have the same next hop and thus the same layer 2 encapsulation and a similar label operation. Examples of similar label operations include a pop of the same number of labels or a partial swap of the top label, followed by a push of an identical label stack (which could be empty) on top of current label stack.

In other words, router 12B may only perform a partial swap for inter-area LSPs, such as LSP 20, where router 12A may aggregate labels within label prefixes in a manner that permits this partial swap. In some instances, router 12A may not be able to aggregate every one of the labels according to the above rules that permit partial swaps. Router 12A may still advertise the summarized versions of the mapping but may further include within the advertisement one-to-one mappings for those labels that do not adhere to each of the above rules. In this manner, router 12B may use label prefix for the aggregate and use "more specifics" for the exceptions. Thus, while described herein with respect to easily aggregating labels into label prefixes, the techniques may be implemented in such a manner to enable a variety of advertising schemes that advertise labels to adjust for more complicated contexts, such as those that may require "more specifics" to appropriately perform label-based routing.

Router 12A may then receive the MPL packet and perform a lookup on forwarding table 28A, which maps a label to another label on a one-to-one basis. Router 12A may swap the label with the other label and forward the MPLS packet to router 12C. Router 12C may pop the label and forward the packet to its intended destination address. In this respect, routers 12 may more efficiently maintain label to destination address mappings, advertise label to destination address mappings, maintain label swap operations on a label prefix-to-label prefix basis, swap labels, and otherwise improve the operation and resource utilization of an MPLS network, such as network 14.

Figure 3:
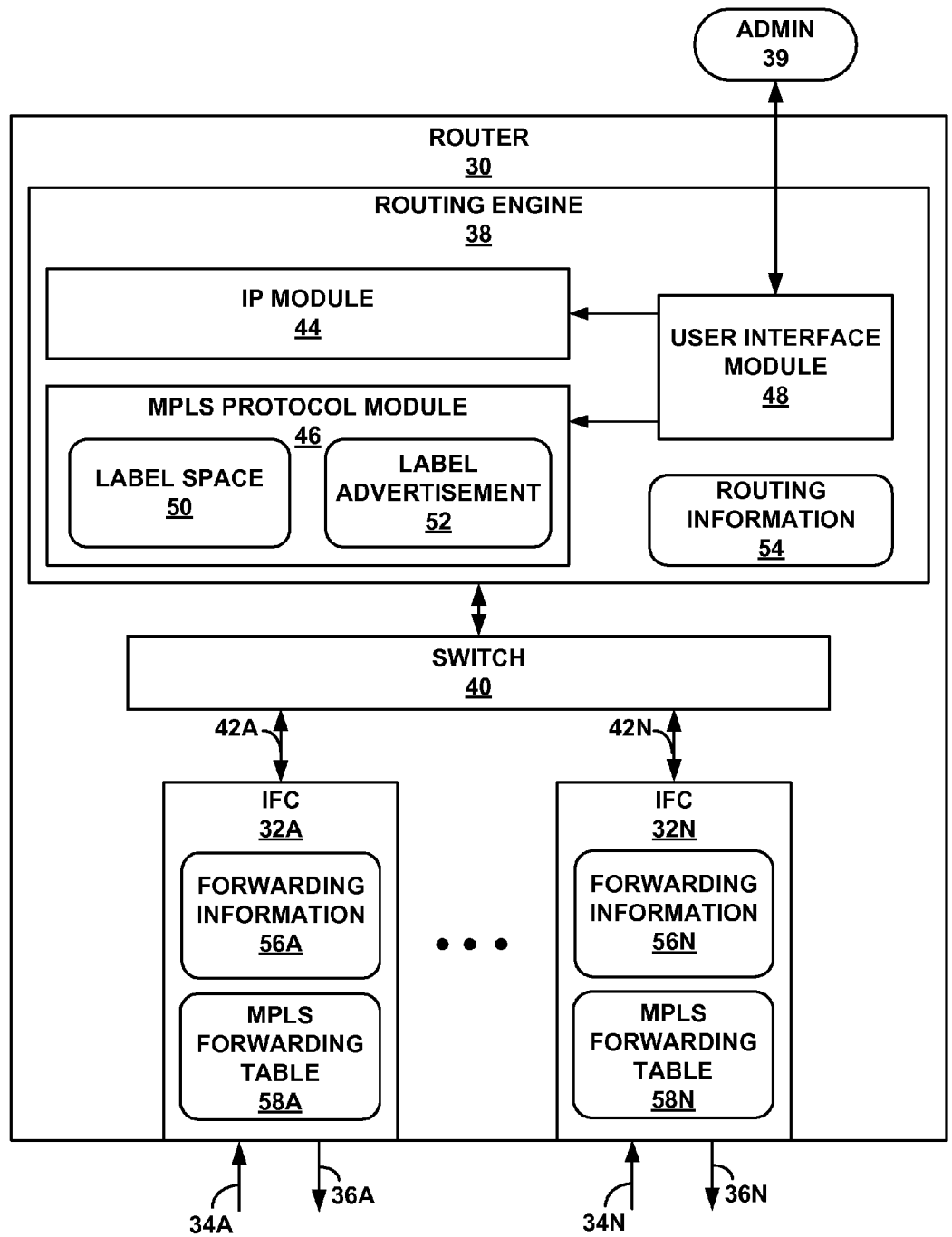
FIG. 3 is a block diagram illustrating an example embodiment of a router that implements the label context transmission techniques described herein.

FIG. 3 is a block diagram illustrating an example embodiment of a router 30 that implements the label context transmission techniques described herein. Router 30 may represent a transit network device or router similar to either of routers 12A, 12B, however the techniques may be implemented by any network device including both ingress and egress network devices, as well as, any other network device that utilizes labels to forward traffic.

In the exemplary embodiment of FIG. 2, router 30 includes Inter-Face Cards (IFCs) 32A-32N ("IFCs 32") that receive and send data units, such as packet flows, via network links 34A-34N and 36A-36N, respectively. Router 30 may include a chassis (not shown) having a number of slots for receiving a set of cards, including IFCs 32. Each card may be inserted into a corresponding slot of the chassis for electrically coupling the card to routing engine 38 via high-speed switch 40 and internal data paths 42A-42N ("internal data paths 42").

Switch 40 also provides an interconnect path between each of IFCs 32. Switch 40 may comprise, for example, switch fabric, switchgear, a configurable network switch or hub, or other high-speed switching mechanisms. Internal data paths 42 may comprise any form of communication paths, such as electrical paths within an integrated circuit, external data busses, optical links, network connections, wireless connections, or other communication paths. IFCs 32 may be coupled to network links 34A-34N and 36A-36N via a number of physical interface ports (not shown). Generally, IFCs 32 may each represent one or more network interfaces by which router 30 may interface with links of a network, such as links 18 of network 14.

In general, routing engine 38 operates as a control unit for router 30. Routing engine 38 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 38 may further include computer readable storage medium, such as dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include instructions that cause a programmable processor to perform the techniques described herein.

Routing engine 38 may further include an Internet Protocol (IP) module 44 ("IP module 44"), an MPLS protocol module 46 and a user interface (UI) module 48. IP module 44 may represent a hardware and/or software module that implements the Internet protocol. MPLS protocol module 46 may represent a hardware and/or software module that implements the above describes signaling and path management protocols, such as the above described LDP, the above described RSVP, or other protocols including the Border Gateway Protocol (BGP). MPLS protocol module 46 may include and maintain label space 50, which may be similar to label spaces 24 described with respect to FIG. 2. MPLS protocol module 46 may be extended to implement, not only these protocols, but also the label prefix techniques described herein. For example, MPLS protocol module 46 may be either dynamically or statically configured to reserve a contiguous block of labels within label space 50, and generate and transmit a label advertisement 52 that advertises a summarized version of a mapping between the block of labels and an IP prefix, for example. User interface module 48 may represent a hardware and/or software module that presents a user interface with which an administrator or other user, such as administrator 39 ("admin 39"), may interact to configure or provision router 30.

Routing engine 38 may further include and maintain routing information 54 that reflects a topology of a network. Router 30 may maintain routing information 54 in the form of one or more tables, databases, link lists, radix trees, databases, flat files, or any other data structure. Based on routing information 54, routing engine 38 generates forwarding information 56A-56N ("forwarding information 56") for IFCs 32.

Each of the IFCs 32 includes a forwarding component (not shown) that forwards packets in accordance with forwarding information 56 and MPLS forwarding tables 58A-58N ("MPLS forwarding tables 58") generated by routing engine 38. Specifically, the forwarding components of IFCs 32 determine a next hop for each inbound packet based on forwarding information 56, identify the corresponding one of IFCs 32 associated with the next hop, and relay the packets to the appropriate one of IFCs 32 via switch 40 and corresponding ones of data paths 42.

IFCs 32 may further include and maintain MPLS forwarding tables 58. MPLS forwarding tables 58 correlate labels associated with incoming MPLS packets with next hops. While shown as a separate table for ease of illustration, each of MPLS forwarding tables 58 may each be included within respective ones of forwarding information 56. In accordance with the principles of the invention, MPLS forwarding tables 58 may be extended to support label prefix-to-IP address prefix mappings. That is, each of MPLS forwarding tables 42 may comprise an entry for a label prefix, where each label prefix entry includes one or more fields indicating the label prefix, an action or operation to take with respect to the label prefix, such as swapping the label prefix with another label prefix.

In one embodiment, routing engine 38 may maintain master copies of MPLS forwarding tables 58 and may distribute copies of these tables to each of IFCs 32. Routing engine 38 may add, remove, or modify entries to MPLS forwarding tables 58 and may distribute updated copies to IFCs 32. In another embodiment, routing engine 38 may parse the information in MPLS forwarding tables 58 and send only that forwarding information needed by each of IFCs 32 based on the interfaces associated with each of IFCs 32.

According to the label prefix techniques described in this disclosure, an administrator, such as admin 39, may initially interact with router 30 via user interface module 48 to provision router 30. In particular, admin 39 may interact with a user interface presented by user interface module 48 to provision an IP subnet to which router 30 belongs. Generally, admin 39 may interact with the user interface to define or indicate an area to which router 30 belongs. User interface module 48 may receive this IP subnet or, more generally area, and forward this information to IP module 44 and MPLS protocol module 46.

MPLS protocol module 46 may receive this information and, in response to receiving this information, reserve a contiguous block or range of labels within label space 50, such that one label is reserved for each of the unique IP addresses included within the IP prefix, as described above. MPLS protocol module 46 may then receive label advertisements, similar to label advertisement 52, from other LSRs, such as router 12C, and resolve label space 50 with the received label advertisement to produce MPLS forwarding table 58A. MPLS forwarding table 58A may be substantially similar to forwarding tables 28A, 28B described above with respect to FIG. 2.

MPLS protocol module 46 may assign labels from the reserved block of labels within label space 50 to one or more destination IP addresses, as described above, when resolving the label advertisement. MPLS protocol module 46 may then generate and transmit a label advertisement that advertises a summary of the mapping between labels and destination IP addresses, again as described above, to neighboring LSRs, such as router 12B. MPLS protocol module 46 may only transmit this advertisement 52 that includes the summary of the mapping to those neighboring LSRs that reside in different areas from that in which router 30 resides. In this manner, router 30 may more efficiently establish an inter-area path through an MPLS network using summarized mappings.

After establishing the path, routine engine 38 may update routing information 54 to reflect the path and install within one or more of forwarding information 56 and MPLS forwarding tables 58 the bindings or correlations between labels and next hops for the particular path. Routine engine 38 may continue to resolve paths and update IFCs 32 in this manner.

IFCs 32 may, meanwhile, receive packets. As router 30 is assumed for purposes of illustration to represent a transit network device, IFCs 32 may generally receive MPLS packets that correspond to a particular one of the plurality of paths resolved by routing engine 38. IFCs 32 may inspect, for each MPLS packet, a top-most or first label included within the label stack defined by the MPLS header of the MPLS packet. IFC 32A may, for example, upon receiving an MPLS packet via link 34A and inspecting the MPLS packet in this manner, use the determined top-most label as a key into MPLS forwarding table 58A. IFC 32A perform a longest prefix match lookup and may retrieve a label prefix entry based on the top-most label and determine a next hop associated with the label, and an action to take (e.g., pop, swap, or push).

IFC 32A may then take the action specified by the corresponding label entry. If the action indicates a swap (as is most likely considering that router 30 is assumed to be a transit network device), IFC 32A may replace or swap the top-most label with the label indicated by the action. In some instances, IFC 32A may perform a partial swap or prefix swap, whereby IFC 32A only swaps a portion or prefix of the label with another portion or prefix of the label, as described above.

After taking the above described action, IFC 32A may forward the MPLS packet to the one of IFCs 32 associated with the next hop, as specified by forwarding information 56A. That is, IFC 32A accesses forwarding information 56A using the next hop as a key to retrieve an entry associated with the next hop. The next hop entry may comprise an IP address or IP prefix assigned to the next network device along the path associated with the top-most label. The next hop entry may identify one of IFCs 32 that couples to the next hop, and IFC 32A may forward the MPLS packet via switch 40 and data paths 42 to the identified one of IFCs 32, which proceeds to forward the MPLS packet via a corresponding one of outbound links 36.

The embodiment of router 30 shown in FIG. 2 is illustrated for exemplary purposes. Alternatively, router 30 may have a centralized control unit having a routing engine and a forwarding engine. In this embodiment, forwarding functionality is not distributed to IFCs 32, but centralized within the forwarding engine. Moreover, the principles of the invention can be realized within a layer 2 or layer 3 (of the OSI model) switch or other device. However, for ease of illustration, the principles of the invention are illustrated in the context of router 30.

Figure 4A:
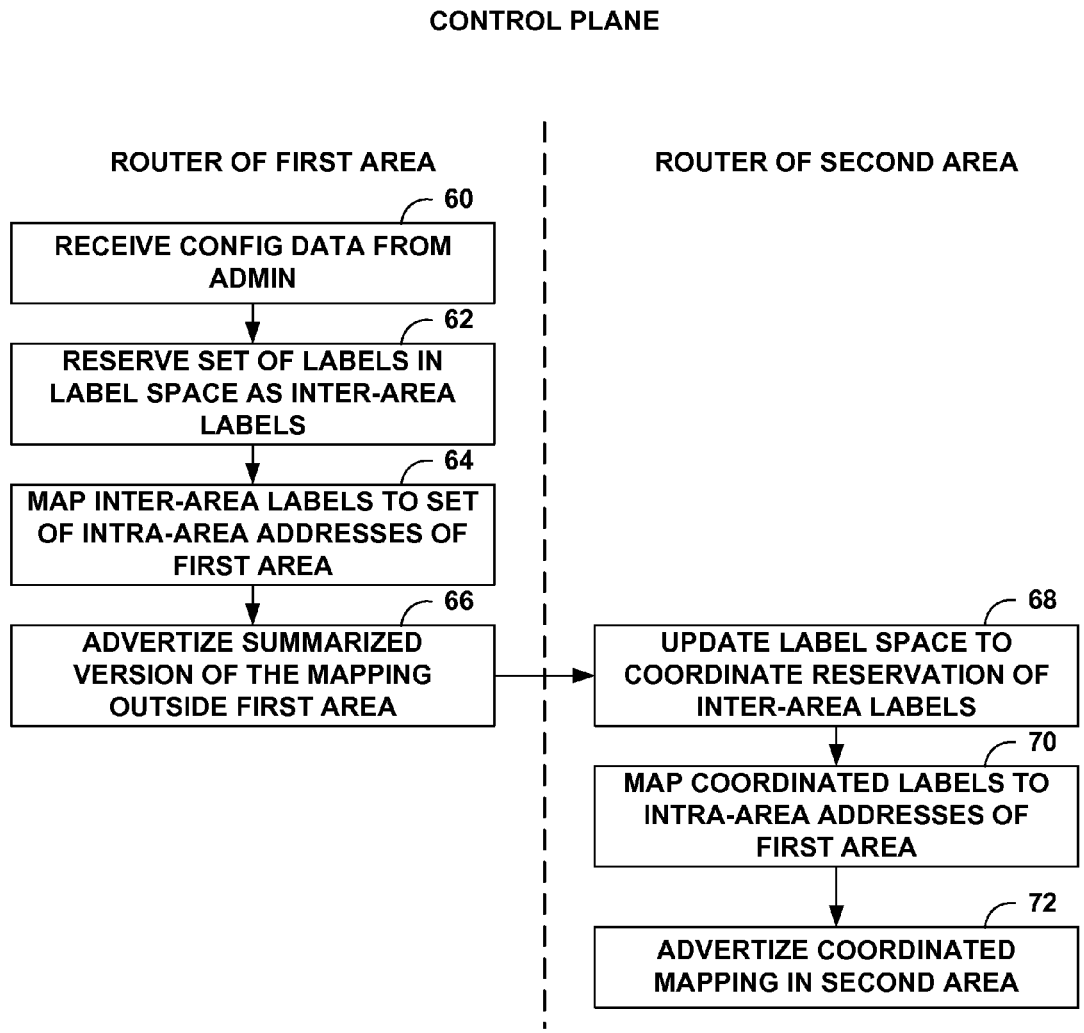
FIGS. 4A, 4B are flowcharts illustrating example operation of routers within a network in implementing the techniques described herein.
Figure 4B:
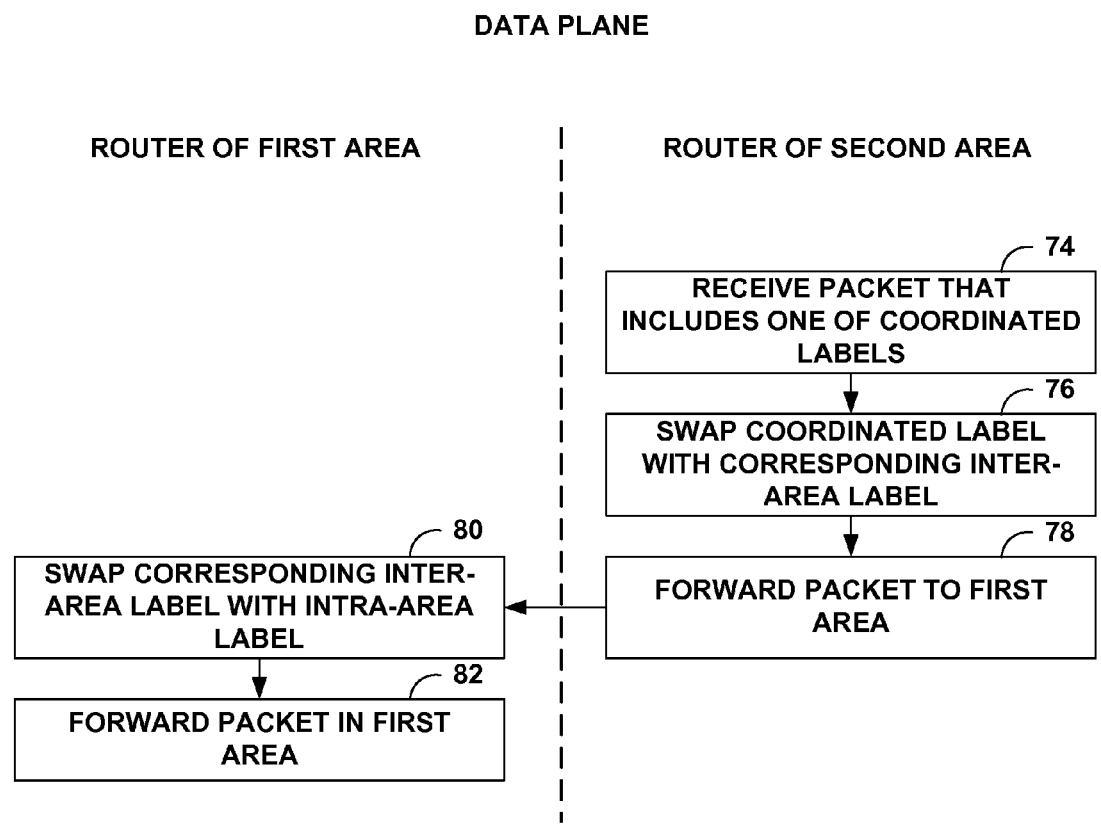

FIGS. 4A, 4B are flowcharts illustrating example operation of routers within a network in implementing the techniques described herein. While described below with respect to routers 12A, 12B within network 14, as shown in FIG. 2, the techniques may be implemented by any network device that advertises label mappings in accordance with a network protocol.

FIG. 4A describes control plane operation of routers 12A, 12B while FIG. 4B illustrates data plane operation of router 12A, 12B. Control and data planes may represent logical divisions within each of routers 12A, 12B. Routing engine 38 of FIG. 3 may represent a control plane of router 30 that implements the control plane operations responsible for controlling delivery of data, maintaining a network topology and other management operations. IFCs 32 may represent a data plane of router 30 that implement the data plane operations responsible for handling data received via network links 34, processing that data (e.g., push, popping or swapping MPLS labels), and forwarding the data via links 36.

Referring first to the example of FIG. 4A, an administrator, such as admin 39, may configure a control plane (e.g., routing engine 38) of a first router 12A of a first area 16A by interacting with a user interface presented by a user interface module, such as user interface module 48 of FIG. 3, to input configuration data. The user interface module of router 12A may receive the configuration data ("config data") from admin 39, where the configuration data defines first area 16A as a contiguous or sequential set of destination addresses (60). In other words, the configuration data may identify an IP prefix that defines an IP subnet 16A, as described above.

Based on this IP prefix, router 12A, and more particularly, an MPLS protocol module, such as MPLS protocol module 46, may be configured to automatically reserve a contiguous or sequential set of labels, e.g., block of labels 26A, within label space 24A as a set of inter-area labels (62). That is, block of MPLS labels 26A may be reserved for inter-area LSPs, such as LSP 20, to enable the summarized version of the mapping between block of labels 26A and the IP addresses included within the IP prefix received from admin 39. In this respect, block of labels 26A may be referred to as "inter-area labels 26A" as these labels are reserved for use in establishing inter-area LSPs by way of inter-area advertisements.

Further, router 12A reserves the block of labels for traffic destined to area 16A for which an upstream LSR can use a common MPLS forwarding operation. In other words, the upstream LSR may apply the same next hop forwarding action to the labels matching the label prefix. In general, with respect to the upstream LSR, this means all matching labels have the same nexthop (router 12A in this case) and, thus, the same layer 2 encapsulation. Moreover, the upstream router can apply a similar label operation to all labels matching the prefix, such as one of: i) pop the same number of labels from the label stack of the MPLS packet to be forwarded; or ii) partial swap the top label, then push an identical label stack, which may be an empty stack. Further, all labels matching the label prefix may receive the same CoS and TTL treatment by the upstream LSR.

After reserving this block of labels 26A of the appropriate number in the manner described above (e.g., based on the number of IP addresses defined by the IP prefix), router 12A binds the label prefix representing the inter-area labels 26A to the IP prefix representing one or more of the set of intra-area addresses, e.g., IP addresses, of first area 16A (64). After mapping inter-area labels 26A to one or more IP addresses included within the IP prefix, router 12A and, more particularly, the MPLS protocol module of router 12A, may generate and transmit an advertisement that advertises a summarized version of the mapping between inter-area labels 26A and the one or more IP addresses included within the IP prefix, as described above (66). More specifically, router 12A may advertise the summarized version of the mapping as a mapping between an MPLS label prefix representative of inter-area labels 26A and the IP prefix, thereby reducing advertisement overhead.

A router 12B may receive the advertisement and update label space 24B to coordinate reservation of inter-area labels (68). For example, router 12B may receive the advertisement that maps the label prefix $027_{16}/12_{10}$ to IP prefix $0A.00.01_{16}/24_{10}$, and, in response, update label space 24B to reserve block of labels 24B such that block of labels 24B may include the same number of labels, e.g., as label prefix $023_{16}/12_{10}$ is the same size as $027_{16}/12_{10}$, and map to the same IP prefix $0A.00.01_{16}/24_{10}$. In this manner, router 24B may "coordinate" reservation of inter-area labels and map coordinated labels 26B to intra-area addresses of first area 16A (70). In other words, router 12B may map label prefix $023_{16}/12_{10}$ to IP prefix $0A.00.01_{16}/24_{10}$, thereby mapping coordinated labels 26B to intra-area addresses of first area 16A. Once mapped, router 12B may advertise this coordinated mapping to other routers, e.g., router 12D, included within second area 16B (72). In this manner, routers 12 may establish inter-area LSP 20.

Referring to the example of FIG. 4B, at some point after establishing LSP 20, router 12B may receive with the data plane (e.g., IFCs 32) from router 12D an MPLS packet that includes a label stack having one of the coordinated labels of block of labels or inter-area labels 26B (74). The data plane of router 12B may perform a lookup in forwarding table 28B, which may represent either forwarding tables 56, MPLS forwarding table 58 or a combination of both tables 56 and 58, using the coordinated label as a key. The data plane of router 12B may perform a longest-prefix match when performing the lookup whereby router 12B may only match a portion of the coordinated label to a label prefix. The data plane of router 12B may determine that the coordinated label matches label prefix $023_{16}/12_{10}$ in this instance and perform a partial swap or partially swap a prefix of the coordinated label, e.g., $023_{16}$, with the label prefix to which the coordinated label maps, e.g., $027_{16}$ (76). Once swapped, the data plane of router 12B may forward this MPLS packet in the manner described above to router 12A (78).

The data plane of router 12A may receive the packet and perform a lookup of forwarding table 28A to swap the corresponding inter-area label with an intra-area label, as described above (80). The data plane of router 12A may then forward the MPLS packet in first area 16A (82). That is, router 12A may forward the MPLS packet to router 12C of first area 16A via LSP 20. In this manner, network devices, such as routers 12, may improve the efficiency with which network devices transmit MPLS advertisements, perform label lookups and swap labels.

While described above with respect to MPLS protocols, the techniques may be implemented with respect to other signaling and path management protocols, such as the Border Gateway Protocol (BGP). Various embodiments of the invention have been described. These and other embodiments are within the scope of the following claims.

The invention claimed is:

1. A method comprising:
maintaining, with a first router of a first area of a network, a label space defining a plurality of labels available for mapping to a plurality of addresses assigned to network devices within the network;
reserving, with the first router, a contiguous set of the plurality of labels defined by the label space;
mapping, with the first router, the contiguous set of labels to a plurality of first area addresses, wherein the first area addresses include those addresses of the plurality of addresses available for assignment to network devices within the first area of the network; and
transmitting, with the first router to a second router different than the first router of a second area of the network different from the first area, an advertisement that advertises a summarized version of the mapping between the contiguous set of labels and the first area addresses as a prefix mapping between a label prefix that summarizes the contiguous set of labels and a network address prefix that summarizes the first area addresses.

2. The method of claim 1, wherein the network address prefix comprises an Internet Protocol (IP) prefix that summarizes the first area addresses.

3. The method of claim 1, wherein reserving the contiguous set of the plurality of labels comprises:
receiving configuration data that defines the first area addresses;
determining, based on the configuration data, a number of the plurality of labels to reserve; and
reserving the determined number of the plurality of labels as the contiguous set of the plurality of labels.

4. The method of claim 3,
wherein receiving the configuration data comprises receiving an Internet Protocol (IP) address prefix that defines a contiguous set of IP addresses assigned to devices included within the first area,
wherein determining the number of the plurality of labels to reserve comprises determining the number of the plurality of labels based on a number of IP addresses included within the contiguous set of IP addresses, and
wherein reserving the determined number of the plurality of labels comprises reserving the determined number of labels such that the number of reserved labels equals the number of IP addresses included within the contiguous set of IP addresses.

5. The method of claim 1, wherein mapping the contiguous set of labels to a plurality of first area addresses comprises mapping one or more of the contiguous set of labels to Internet Protocol (IP) addresses assigned to devices within the first area, wherein the first area is defined by an IP address prefix.

6. The method of claim 1, further comprising:
receiving, from the second router included within the second area, an MPLS packet that includes one of the contiguous set of reserved labels, wherein each of the contiguous set of reserved labels comprise an inter-area label;
swapping, with the first router, the inter-area label with an intra-area label; and
forwarding, within the first area, the MPLS packet with the intra-area label.

7. The method of claim 1,
wherein the label space comprises a first label space, wherein the contiguous set of labels comprises a first contiguous set of labels, and wherein transmitting the advertisement comprises transmitting the advertisement such that the second router coordinates a second label space maintained by the second router with the first label space maintained by the first router in order to reserve a second contiguous set of labels different from the first set of contiguous labels within the second label space.

8. The method of claim 1, wherein the network comprises an MPLS network, wherein the first area of the network comprises a first Internet Protocol (IP) sub-network (subnet) identified by a first IP prefix, wherein the second area of the network comprises a second IP subnet identified by a second IP prefix, wherein the first router comprises a first Label Switching Router (LSR), and wherein the second router comprises a second LSR.

9. A first router included within a first area of a network, the first router comprising:

a control unit that maintains a label space defining a plurality of labels available for mapping to a plurality of addresses assigned to network devices within the network, reserves a contiguous set of the plurality of labels defined by the label space and maps the contiguous set of labels to a plurality of first area addresses, wherein the first area addresses include those addresses of the plurality of addresses available for assignment to network devices within the first area of the network; and at least one interface card that transmits, to a second router different than the first router of a second area of the network different from the first area, an advertisement that advertises a summarized version of the mapping between the contiguous set of labels and the first area addresses as a prefix mapping between a label prefix that summarizes the contiguous set of labels and a network address prefix that summarizes the first area addresses.

10. The first router of claim 9, wherein the network address prefix comprises an Internet Protocol (IP) prefix that summarizes the first area addresses.

11. The first router of claim 9, wherein the control unit includes:

a user interface module that receives configuration data that defines the first area addresses; and a Multi-Protocol Label Switching (MPLS) protocol module that determines, based on the configuration data, a number of the plurality of labels to reserve, and reserves the determined number of the plurality of labels as the contiguous set of the plurality of labels.

12. The first router of claim 11, wherein the user interface module receives an Internet Protocol (IP) address prefix that defines a contiguous set of IP addresses assigned to devices included within the first area, and wherein the MPLS protocol module determines the number of the plurality of labels based on a number of IP addresses included within the contiguous set of IP addresses, and reserves the determined number of labels such that the number of reserved labels equals the number of IP addresses included within the contiguous set of IP addresses.

13. The first router of claim 9, wherein the control unit comprises an Multi-Protocol Label Switching (MPLS) protocol module that maps one or more of the contiguous set of labels to Internet Protocol (IP) addresses assigned to devices within the first area, wherein the first area is defined by an IP address prefix.

14. The first router of claim 9, wherein the at least one interface card receives, from the second router included within the second area, an MPLS packet that includes one of the contiguous set of reserved labels, wherein each of the contiguous set of reserved labels comprise an inter-area label, swaps the inter-area label with an intra-area label, and forwards, within the first area, the MPLS packet with the intra-area label.

15. The first router of claim 9, wherein the label space comprises a first label space, wherein the contiguous set of labels comprises a first contiguous set of labels, and wherein the interface card transmits the advertisement such that the second router coordinates a second label space maintained by the second router with the first label space maintained by the first router in order to reserve a second contiguous set of labels different from the first set of contiguous labels within the second label space.

16. The first router of claim 9, wherein the network comprises an MPLS network, wherein the first area of the network comprises a first Internet Protocol (IP) sub-network (subnet) identified by a first IP prefix, wherein the second area of the network comprises a second IP subnet identified by a second IP prefix, wherein the first router comprises a first Label Switching Router (LSR), and wherein the second router comprises a second LSR.

17. A network system comprising:

a network that includes a first area and a second area, wherein the first and second areas are different from each other;

a first router included within the first area; and a second router included within the second area, wherein the second router is different from the first router, and wherein the first router includes:

a control unit that maintains a label space defining a plurality of labels available for mapping to a plurality of addresses assigned to network devices within the network, reserves a contiguous set of the plurality of labels defined by the label space and maps the contiguous set of labels to a plurality of first area addresses, wherein the first area addresses include those addresses of the plurality of addresses available for assignment to network devices within the first area of the network; and at least one interface card that transmits, to a second router different than the first router of a second area of the network different from the first area, an advertisement that advertises a summarized version of the mapping between the contiguous set of labels and the first area addresses as a prefix mapping between a label prefix that summarizes the contiguous set of labels and a network address prefix that summarizes the first area addresses.

18. The network system of claim 17, wherein the network address prefix comprises an Internet Protocol (IP) prefix that summarizes the first area addresses.

19. A non-transitory computer-readable medium comprising instructions for causing a programmable processor to:

maintain, with a first router of a first area of a network, a label space defining a plurality of labels available for mapping to a plurality of addresses assigned to network devices within the network;

reserve, with the first router, a contiguous set of the plurality of labels defined by the label space;

map, with the first router, the contiguous set of labels to a plurality of first area addresses, wherein the first area addresses include those addresses of the plurality of addresses available for assignment to network devices within the first area of the network; and transmit, with the first router to a second router different than the first router of a second area of the network different from the first area, an advertisement that advertises a summarized version of the mapping between the contiguous set of labels and the first area addresses as a prefix mapping between a label prefix that summarizes the contiguous set of labels and a network address prefix that summarizes the first area addresses.

20. The non-transitory computer-readable medium of claim 19, wherein the network address prefix comprises an Internet Protocol (IP) prefix that summarizes the first area addresses.

* * * * *